Dec. 13, 1927.
R. S. SANFORD
1,652,290
BRAKE SYSTEM
Filed Sept. 29, 1926
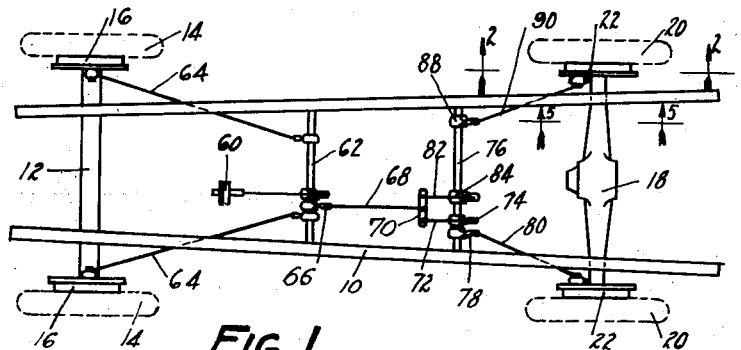
FIG. 1
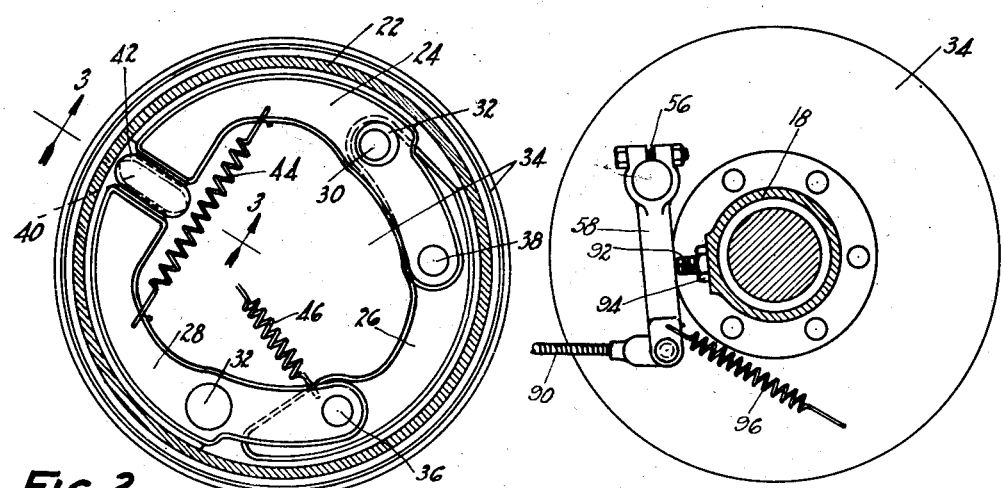
FIG. 2
FIG. 5
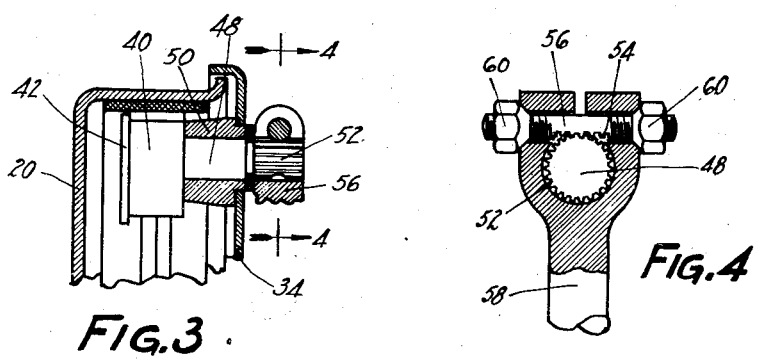
FIG. 3
FIG. 4
INVENTOR
Roy S Sanford
BY
*Jn. W. McConkey*
ATTORNEY Patented Dec. 13, 1927.

1,652,290

UNITED STATES PATENT OFFICE.

ROY S. SANFORD, OF SOUTH BEND, INDIANA, ASSIGNOR TO BENDIX BRAKE COMPANY, OF CHICAGO, ILLINOIS, A CORPORATION OF ILLINOIS.

BRAKE SYSTEM.

Application filed September 29, 1926. Serial No. 138,377.

This invention relates to brakes and is illustrated as embodied in an automobile chassis having brakes on all four wheels. An object of the invention is to provide novel means for adjusting the brakes, preferably arranged to include means for centering an equalizer acting on two or more different brakes. In one desirable arrangement, the brakes are applied through operating arms arranged to be adjusted and which engage stop parts, mounted on the axle or other stationary part of the chassis, the arms being connected to opposite ends of the equalizer so that when they engage the stop parts when the brakes are released they automatically return the equalizer to a predetermined centered position.

Another feature of novelty relates to arranging a stop to determine the idle position of the brake-applying arm, and which may be the above-described stop acting to center the equalizer, so that the adjusting means acting on the arm and changing the relative angular positions of the arm and the cam shaft will turn the cam to preserve an adjusted clearance between the brake shoes and the brake drum, the stop holding the cam in its adjusted position giving the desired clearance, against the resistance of the return spring of the brake.

The above and other objects and features of the invention, including various combinations of parts and desirable particular constructions, will be apparent from the following description of one illustrative embodiment shown in the accompanying drawings, in which:

Figure 1 is a top plan view of an automobile chassis embodying the invention;

Figure 2 is a section on the line 2—2 of Figure 1 vertically through one of the rear brakes, showing the brake shoes in side elevation;

Figure 3 is a partial section through the brake on the line 3—3 of Figure 2 and showing the arrangement of the cam and cam shaft;

Figure 4 is a partial section on the line 4—4 of Figure 3 through the brake-applying arm, showing its adjustable connection to the cam shaft; and Figure 5 is a section on the line 5—5 of Figure 1 showing the engagement of the brake-applying arm with its stop.

The chassis shown in Figure 1 includes the usual frame 10 supported by springs on a front axle 12 carried by road wheels 14 having brakes 16 and on a rear axle 18 having drive wheels 20 carrying brake drums 22. Each of the brakes may include three brake shoes 24, 26, and 28 arranged within the drum 22, the shoe 26 being anchored on a pin 30 passing through a relatively large opening 32 in shoe 24 and carried by the brake backing plate 34, and the shoes 24 and 28 being forked at their ends to provide arms straddling opposite ends of the shoe 26 and being pivoted to that shoe by pivot pins 36 and 38. The brake is applied by suitable means such as a double cam 40 having an edge flange 42 confining the shoes 24 and 28 against lateral movement, the cam being arranged to spread the shoes toward the drum against the resistance of a return spring 44, whereupon the shoe 28 forces the shoe 26 toward the drum against the resistance of an auxiliary return spring 46. The above-described brake may be substantially as fully described in Patent No. 1,567,716, granted Bendix Brake Company on December 29, 1925, on an application filed by A. Y. Dodge.

Each of the cams 40 is carried by, or is integral with, a cam shaft 48 journalled in a bracket 50 carried by the backing plate 34 and serrated at its end to form pinion teeth 52 meshing with rack teeth 54 on a cylindrical adjusting member 56 passing through the split hub of an operating arm or lever 58. Nuts 60 are threaded on opposite ends of the adjusting member 56 and adjustment of the shaft 48 angularly with respect to the arm 58 is secured by loosening the one nut 60 and then tightening up on the other. This first shifts the adjusting member 56 lengthwise to make the desired adjustment and then tightens up on the split hub of the arm 56 to clamp it tightly about the serrated part of the shaft 48.

In the particular arrangement illustrated, the four brakes are intended to be applied by depression of a brake pedal 60 which rocks a shaft 62 connected by links 64 with the front brakes 16 and also having an arm 66 connected by link 68 to the center of a floating equalizer bar 70. One end of the equalizer bar 70 is connected by a link 72 to an arm 74 sleeved on a shaft 76 and either integral with or connected to an arm 78 connected by a link or cable 80 to the arm 50 at the left rear brake. The other end of the equalizer bar 70 is connected by a link or cable 82 to an arm 84 keyed to the shaft 76 which carries arm 88 connected by a link or cable 90 to the arm 58 of the right rear brake.

According to an important feature of the invention, the idle position of the equalizer 70, and the idle angular positions of the cams 40, are determined by engagement with the arms 58 of stops 92 adjustably threaded into the housing of the rear axle 18 and clamped in adjusted position by lock-nuts 94. The arms 58 are urged against stops 92 by means such as springs 96.

In the operation of the brakes, the application of the pedal 60 will apply all four of the brakes, the arms 58 being turned in a clockwise direction (Figure 5) away from the stops 92, against the resistance of the springs 96. Then, when the pedal 60 is released, the arms 58 are drawn back into engagement with the stops 92, thus acting through the above-described connections to return the equalizer 70 to its original centered idle position.

Preferably spring 96 is strong enough so that the adjustment of the cam shaft 48 and cam 40 with respect to the arm 58, by the lengthwise movement of the adjusting member 56, will not separate the arm 58 from the stop 92, but will instead turn the cam shaft 48 inside the hub of the arm. Thus the cam 40, as it is adjusted from time to time, will gradually assume a position more and more turned toward the position it occupies when the brake is applied, thus holding the shoes 24 and 28 in positions giving a clearance with respect to the brake drum which is determined by the adjustment of members 56. That is, instead of the adjustment for wear of the brake requiring a longer and longer movement of arms 58 to apply the brake, movement of this arm is approximately the same in all positions of adjustment, the clearance between the shoes and the drum being adjusted to be approximately the same at all times, the wear being compensated for by shifting the idle angular position of the cam 40.

While one illustrative embodiment of the invention has been described in detail, it is not my intention to limit its scope to that particular embodiment or otherwise than by the terms of the appended claims.

I claim:

1. A vehicle having, in combination, an axle with a brake at each end, an operating arm for each brake, an equalizer connected to said arms, and a stop part opposite each arm to be engaged thereby when the brake is released and thus center the equalizer.

2. A vehicle having, in combination, an axle with a brake at each end, an operating arm for each brake, an equalizer connected to said arms, and a stop part mounted on the axle opposite each arm to be engaged thereby when the brake is released and thus center the equalizer.

In testimony whereof, I have hereunto signed my name.

ROY S. SANFORD.